Feb. 23, 1932.     E. H. HORSTKOTTE     1,846,870
MOTOR CONTROL SYSTEM
Filed May 4, 1929
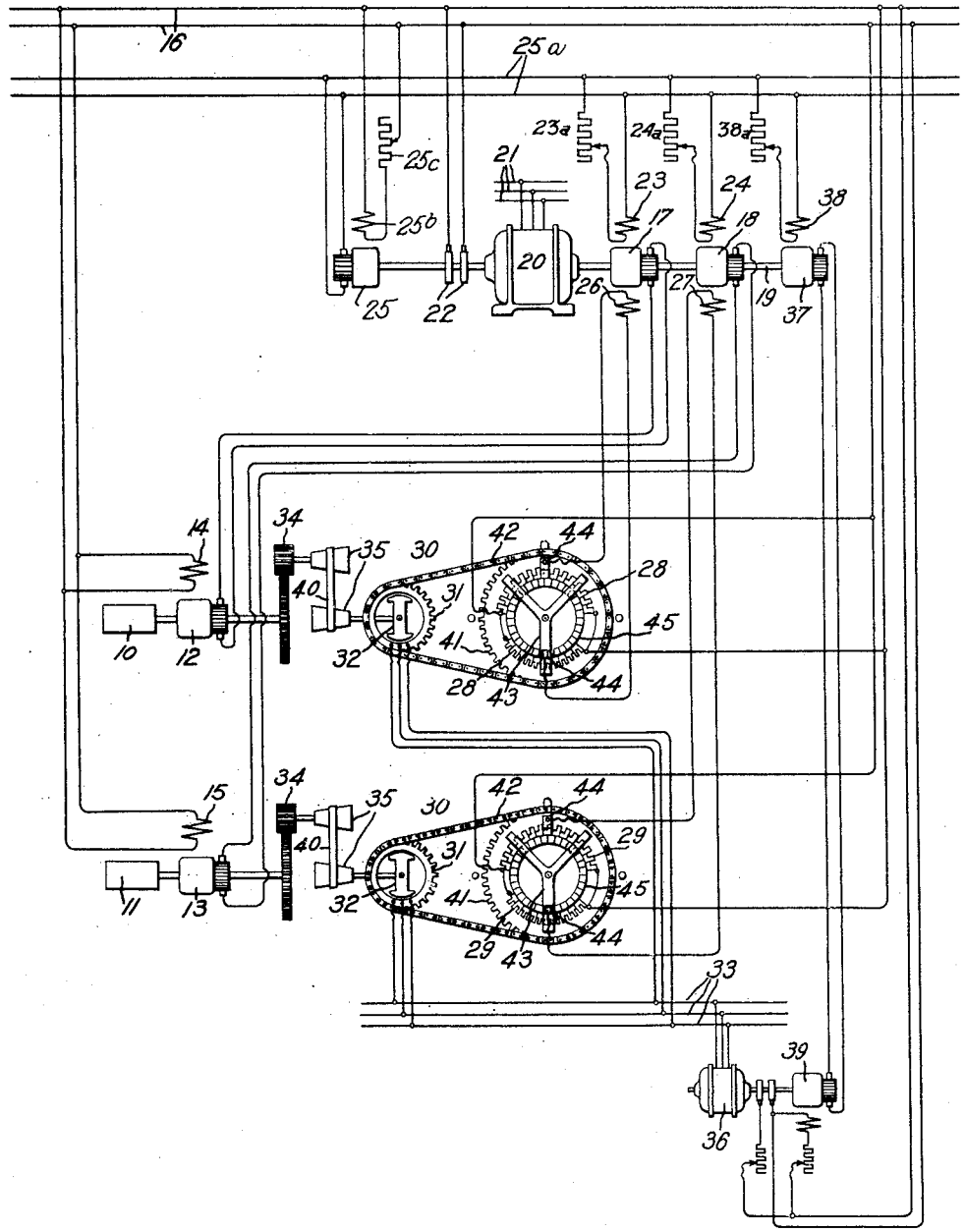
Inventor:
Edward H. Horstkotte,
by Charles E. Tullar
His Attorney.

Patented Feb. 23, 1932

1,846,870

UNITED STATES PATENT OFFICE

EDWARD H. HORSTKOTTE, OF SCHENECTADY, NEW YORK, ASSIGNOR TO GENERAL ELECTRIC COMPANY, A CORPORATION OF NEW YORK

MOTOR CONTROL SYSTEM

Application filed May 4, 1929. Serial No. 360,417.

This invention relates to systems for controlling operations of electric motors, and it relates more particularly to systems in which a driving motor is arranged to have its speed adjusted over a wide range of basic values, and has for an object the provision of means for effecting substantially equal regulation for equal valued fluctuations in a basic speed of the motor at all values of basic speed within the range.

In illustrating my invention in one form thereof, I have shown it as embodied in a sectional motor drive in which a plurality of motors supplied from a plurality of respective generators are employed to drive the sectional rolls of a paper making machine or the like.

In carrying my invention into effect in one form thereof I provide a generator with an auxiliary field winding supplied from a constant source of excitation and I further provide a regulating device for varying the current flowing in the auxiliary field winding in accordance with fluctuations in a characteristic of the generator or in accordance with fluctuations in a characteristic of a motor supplied therefrom.

For a better and more thorough understanding of the invention, reference should now be made to the following specification and to the accompanying drawing, the single figure of which is a diagrammatical representation of a system embodying my invention.

Referring now to the drawing, a plurality of sectional rolls 10 and 11, such for example as the sectional rolls of a paper making machine or the like, are arranged to be driven by a plurality of respective independent electric driving motors such as the shunt wound direct current electric motors 12 and 13. Excitation is supplied to the respective shunt field windings 14 and 15 of these motors from a source of constant excitation represented in the drawing by the two supply lines 16.

The armatures of the motors 12 and 13 are directly connected to and supplied from a plurality of independent supply generators 17 and 18, respectively. These generators are mounted upon a shaft 19 which is driven at a substantially constant speed by a large synchronous motor 20. Power is supplied to the stator windings of the synchronous motor 20 from a suitable three-phase source of supply such as that represented by the three supply lines 21. The terminals of the direct current field windings of the synchronous motor 20 are brought out to slip rings 22, which in turn are connected to the source of constant excitation 16. No starting device for the synchronous motor 20 is shown in the drawing since the starting device forms no part of my invention. However, it will be understood by persons skilled in the art that any suitable starting device for the synchronous motor may be employed for connecting the terminals of the windings of the synchronous motor 20 with their respective sources of supply.

It will be understood that the speed of a direct current shunt excited motor is a function of the voltage supplied to its armature. The speeds of motors 12 and 13 may therefore be varied by varying the currents flowing in the field windings 23 and 24 of generators 17 and 18 to vary the voltages generated by these generators and supplied to the motors 12 and 13, respectively. Provision is made for varying the speed of the drive as a whole, i. e., the speeds of all the motors simultaneously in the form of a variable source of excitation represented in the drawing by the exciter 25 to the armature of which field windings 23 and 24 of the supply generators 17 and 18 are connected by means of the supply busses 25a. The exciter 25 is provided with a field winding 25b supplied from the constant source of supply 16; a suitable variable resistance 25c being included in the circuit for varying the electromotive force generated by the exciter and the excitation of the field windings 23, 24 of the supply generators. It will thus be seen that the electromotive forces generated by the supply generators and consequently the speeds of the motors 12, 13 may be simultaneously varied by varying the excitation of the exciter 25. Alternately the source 25 may be maintained constant, and the speed of the drive as a whole adjusted by simultaneously varying the resistances 23a, 24a and 38a respectively connected in the circuits of field windings 23, 24 and 38. It will therefore be clear that by simultaneously varying the excitation of these field windings in a suitable manner as explained above the speed of the drive as a whole may be adjusted over a wide range of values.

In order that the speed of each sectional drive motor may be maintained constant at any desired basic speed to which it may be adjusted, a suitable speed regulating device is necessary.

Persons skilled in the art will understand that if a resistance type speed regulator is employed in the field circuit to regulate a characteristic of a dynamo electric machine which characteristic is adjustable over a wide range of values by variations in the currents flowing in the field winding that the regulating effect of the regulator will be greater at high values of the field current than at low values thereof. For instance, it will be clear that the regulation produced by a given ohmic change of the regulating resistance on a field winding through which one ampere of current is flowing will be much greater than the regulation produced by the same ohmic change of the same regulating resistance upon a field winding in which one-tenth of an ampere is flowing. Thus, in the particular system disclosed in the drawing, if resistance type regulators were employed in the main field windings 23 and 24 of supply generators 17 and 18, the regulating effect of these regulators would be much greater at high speeds of the drive than it would be at low speeds thereof. The result of all this would be that the action of the regulators would become uncertain, irregular, and even erratic at high speeds, whilst at low speeds the action of the regulator would be too sluggish to effect the quick response desired from a speed regulator.

In order to overcome these inherent disadvantages resulting from the employment of resistance type speed regulators in the main field windings of sectional supply generators 17 and 18, the sectional supply generators 17 and 18 are provided with auxiliary field windings 26 and 27, respectively arranged to be supplied from the constant source of excitation 16. Variable regulating resistances 28 and 29 are provided in the circuits of auxiliary field windings 26 and 27, respectively.

No particular form of resistance type speed regulator is necessary to my invention. However, I prefer to use regulators of the synchronous dynamometer type. As shown in the drawing, a regulator of this type is provided at each section of the drive, i. e., one for each motor. Since these regulators are in all respects identical, a description of but one of them will be given. The speed regulator 30, which is employed to regulate the speed of the sectional drive motor 12, comprises a stator member 31 and a rotor member 32. The stator member 31 is provided with a distributed three-phase winding (not shown) which is connected to be supplied from the three-phase supply buses 33. The rotor member 32 of regulator 30 is a magnetic structure of fixed polarity and it is connected to be driven by the sectional drive motor 12 through suitable gearing 34 and cone pulleys 35 at a speed proportional to the speed of the sectional motor 12.

A master alternator 36 is arranged to be driven at a speed proportional to the basic speed at which it is desired that the drive shall run. A master generator 37 is mounted upon the shaft 19 and is driven by the synchronous motor 20 at a substantially constant speed. The voltage generated by the master generator 37 is a function of the current flowing in its field winding 38 which, as shown in the drawing, is supplied from the variable source of excitation 25. A master direct current motor 39 is supplied from the armature of master direct current generator 37 and drives the master alternator 36 at a speed proportional to the voltage generated by the master direct current generator 37. Therefore, it will be clear that when the voltage of the variable source of excitation 25 is varied to adjust the speed of the drive as a whole to a desired value, the voltage generated by direct current generator 37, the speed of direct current motor 39, and the frequency of the three-phase alternating currents supplied to the stator 31 of regulating device 30 will all vary in the same proportion. The rotating magnetic field set up by the three-phase distributed winding on stator 31 of the regulating device will rotate in space at a speed proportional to the frequency of the currents supplied thereto. The magnetic rotor member 32 of the speed regulator may be adjusted to rotate in synchronism with the rotating magnetic field when the sectional drive motor 12 is rotating at the proper speed, by adjusting the belt 40 on the cone pulleys 35.

The stator member 31 is not biased to any position but is mounted in ball bearings (not shown) and is constructed to be balanced in any position to which it may be moved. As long as the synchronous relation obtains between the rotor 32 and the rotating field of the stator 31, no torque will exist between these two members. This condition will obtain as long as the sectional drive motor 12 is rotating at the desired speed to which it has been adjusted. Should the speed of the motor 12 deviate from this value due, for example, to an overload on the motor or to a fluctuation in the voltage generated by supply generator 17, the motor will tend to drive the rotor member 32 of the regulating device either above or below synchronsim depending upon whether the fluctuation in the speed of the motor is above or below the desired speed. Due to a well known property of synchronous machines, the rotor member will remain in synchronism with the rotating field which will effect a rotation of the stator member 31 about its axis of rotation. Rotation of the stator will drive the gear wheel 41 through the chain 42. Rotation of the gear 41 effects rotation of the Y-shaped arm member 43 which carries one of the brushes 44 to which the terminals of the auxiliary field winding 26 of generator 17 are connected. The brushes 44 make contact with a commutator 45 to the segments of which sections of the resistor 28 are connected. The stator member 31 will continue to rotate until the lower brush 44 has been displaced upon the resistor 28 an amount that will vary the current flowing in the auxiliary winding 26 sufficiently to compensate for the fluctuation in speed of the sectional drive motor 12.

Since the auxiliary windings 26 and 27 of the sectional supply generators 17 and 18 are supplied from a constant source of excitation, i. e., a source which does not vary with the speed of the drive, it will be clear that the speed regulators will have the same regulating effect at high speeds of the drive as at low speeds thereof. For any given position of the brushes 44 on the regulating resistor 28 the current flowing in the field winding 26 is the same at all speeds of the drive and as a result the regulating effect of the regulator is equal at all speeds of the drive. Thus, it will be seen that I have provided a system in which substantially equal regulation is provided for equal valued fluctuations in the regulated characteristic at all values within a predetermined range to which this characteristic may be adjusted. An important advantage of this is that the erratic and uncertain action of the resistance type regulators at high values of the regulated characteristic as heretofore employed in the main field winding of the dynamo electric machine is eliminated while the sluggish action of the regulators at low values of the regulated characteristic has been speeded up to give the quick response desired from a speed regulator.

Although in accordance with the provisions of the patent statutes I have illustrated and described my invention as comprising specific elements associated with each other in a particular manner, I would have it understood that the invention is not limited to the particular apparatus shown in the drawing, since alterations and modifications will readily occur to persons skilled in the art without departing from the true spirit of the invention or from the scope of the annexed claims.

What I claim as new and desire to secure by Letters Patent of the United States is:

1. A motor control system comprising a supply generator provided with main and auxiliary field windings, a motor supplied from said generator, means comprising a variable source of excitation for adjusting the voltage of the generator and the speed of the motor over a range of basic values, means for maintaining the speed of said motor constant at a desired basic value comprising a variable resistance device in the auxiliary field circuit and a synchronous dynamometer responsive to fluctuations in a basic speed of said motor for varying said resistance in accordance with said fluctuations, said auxiliary field winding being supplied from a constant source of excitation thereby to insure substantially equal regulation for equal valued fluctuations in speed at all basic values of speed within said range.

2. A motor control system comprising a plurality of sections, each section comprising a supply generator provided with main and auxiliary field windings, a motor supplied by said generator, means for simultaneously adjusting the speeds of all the motors over a range of basic values, said means comprising a variable source of supply for the main field windings of said generators, means for maintaining a constant speed ratio between all of said motors, said means including a separate speed regulating device comprising a synchronous dynamo electric machine responsive to fluctuations in a basic speed of said motor and a resistance controlled by said dynamo electric machine for varying the current in said auxiliary field winding in accordance with said fluctuations, and a constant source of excitation for said auxiliary field windings to insure substantially equi-valued regulation for equi-valued fluctuations in the basic speed of each of said motors at all basic speed values within said range.

3. In a sectional drive for paper making machines and the like, a plurality of motors arranged to run at different speeds having predetermined ratios therebetween, a plurality of separate supply generators for supplying each of said motors respectively, each of said generators being provided with main and auxiliary field windings, a separate variable resistance in circuit with each of said auxiliary field windings, means comprising a variable source of excitation for said main field windings for adjusting the basic speed of the drive as a whole over a predetermined range of values, an alternating current generator having a frequency proportional to the desired speed of said motors and a plurality of synchronous dynamo electric machines, one for each motor, each of said machines having an element driven by its associated motor and a winding energized from said alternating current generator whereby said machine is differentially responsive to the speed of its associated motor and the synchronous speed of said generator, and a driving connection between each of said machines and the variable field resistance of its supply generator whereby said resistances are varied in accordance with fluctuations in the basic speed of said motors to maintain said ratios constant, and a constant source of supply for said auxiliary field windings to effect equal values of regulation for equal valued fluctuations at all basic speeds within said range.

4. A motor control system comprising a supply generator provided with main and auxiliary field windings, a motor supplied by said generator, a source of excitation for said generator, means for varying the excitation of said generator to adjust the voltage of the generator and the speed of the motor over a predetermined range of basic values, a constant source of excitation for said auxiliary field winding, a resistance device in circuit with said auxiliary field winding, and means comprising a synchronous dynamometer driven by said motor, and responsive to variations in a basic speed of said motor for varying said resistance to vary the current in said auxiliary field circuit in accordance with said fluctuations.

In witness whereof I have hereunto set my hand this 3rd day of May, 1929.

EDWARD H. HORSTKOTTE.